United States Patent
Dietterich

(10) Patent No.: US 8,430,605 B2
(45) Date of Patent: Apr. 30, 2013

(54) PNEUMATIC CONVEYANCE SYSTEM INCLUDING WASTE AIRFLOW ELECTRICAL POWER GENERATION

(76) Inventor: Jeffrey Dietterich, Harleysville, PA (US)

( * ) Notice: Subject to any disclaimer, the term of this patent is extended or adjusted under 35 U.S.C. 154(b) by 18 days.

(21) Appl. No.: 12/651,867

(22) Filed: Jan. 4, 2010

(65) Prior Publication Data

US 2010/0183380 A1  Jul. 22, 2010

Related U.S. Application Data

(60) Provisional application No. 61/146,248, filed on Jan. 21, 2009.

(51) Int. Cl.
*B65G 53/00* (2006.01)
(52) U.S. Cl.
USPC .............. 406/197; 406/151; 406/169; 290/43
(58) Field of Classification Search .................. 406/151, 406/169, 197; 290/43, 54; 405/75
See application file for complete search history.

(56) References Cited

U.S. PATENT DOCUMENTS

| | | | | |
|---|---|---|---|---|
| 3,720,840 A * | 3/1973 | Gregg | | 290/55 |
| 3,790,214 A * | 2/1974 | Kilroy | | 299/8 |
| 3,936,652 A * | 2/1976 | Levine | | 290/2 |
| 4,246,753 A | 1/1981 | Redmond | | |
| 4,318,643 A * | 3/1982 | Larsson et al. | | 406/14 |
| 4,352,025 A | 9/1982 | Troyen | | |
| 4,552,573 A * | 11/1985 | Weis et al. | | 55/312 |
| 5,427,491 A * | 6/1995 | Duffy et al. | | 414/291 |
| 5,512,788 A | 4/1996 | Berenda et al. | | |
| 5,734,202 A | 3/1998 | Shuler | | |
| 6,036,407 A * | 3/2000 | Nester | | 406/109 |
| 6,365,985 B1 | 4/2002 | Cohen | | |
| 6,890,129 B2 * | 5/2005 | Fabbri | | 406/106 |
| 7,190,088 B2 | 3/2007 | Heidel | | |
| 7,357,599 B2 | 4/2008 | Cripps | | |
| 7,579,701 B1 * | 8/2009 | White | | 290/43 |
| 7,696,632 B1 * | 4/2010 | Fuller | | 290/54 |
| 2007/0041790 A1 * | 2/2007 | Cripps | | 405/75 |

* cited by examiner

*Primary Examiner* — Joseph A Dillon, Jr.
(74) *Attorney, Agent, or Firm* — Douglas J. Ryder; Ryder, Lu, Mazzeo & Konieczny LLC

(57) ABSTRACT

In general, in one aspect, the disclosure describes a pneumatic conveyance system including waste airflow electrical power generation. The system is to move material from a first location to a second location and includes routing conduit to provide a pathway through which the material is moved, an airflow source to provide an airflow to facilitate the transportation of the material through the routing conduit, a separator to filter the material from the airflow, and an electrical power generating system to generate power from the airflow prior to discharge. The electrical power generating system includes one or more turbines that rotate based on the airflow passing thereby and one or more associated generators that generate electricity based on rotation of the turbines. The power generating system is located within the routing conduit at any point where the airflow is free of particles that would interfere with the turbines.

11 Claims, 6 Drawing Sheets

PNEUMATIC CONVEYANCE SYSTEM INCLUDING WASTE AIRFLOW ELECTRICAL POWER GENERATION

PRIORITY

This application claims the priority under 35 USC §119 of Provisional Application 61/146,248 entitled "Waste Exhaust Air Electrical Power Generating System" filed on Jan. 21, 2009 and having Jeffrey Dietterich as inventor. Application 61/146,248 is herein incorporated by reference in its entirety but is not prior art.

BACKGROUND

Many industries require material to be transported from one step or operation to another. Such transportation may encompass the product, product and byproduct or just the byproduct. This material transportation may be complex and require a series of steps or it may be as simple as one operation. Often those in industry will use some form of a conveyance system to move these materials around the facility to different operations. Such a system may be composed of a series of conveyor belts and chutes to move the material (e.g., move a package from truck A to truck B). Another such system may entail some type of gravitational feed that transports the material (e.g., move grain from a grain silo through an opening onto a conveyor system and into a rail car).

Two common types of conveyance systems used in industry are mechanical conveyance systems and pneumatic conveyance systems. Mechanical conveyance systems may be comprised of a series of belts, rollers, chains, gravitational rollers, chutes or any other of a number of means to mechanically transport an item from location A to location B. However, mechanical conveyance systems can be prone to dust and dirt due to a lack of not being enclosed. Furthermore, mechanical conveyance systems may not be feasible in some environments because of the space requirements to properly layout the system of rollers, belts, chains, and chutes.

Pneumatic conveyance systems are generally comprised of a series of pipes or duct work that is connected to a vacuum or compressor. Material is sucked or pushed through this duct work from location A to location B. Pneumatic conveyance systems require much less space to operate than mechanical conveyance systems (have smaller foot print). Essentially, a pneumatic conveyance system needs only enough space within which to run the piping for the system. Since pneumatic conveyance systems are completely enclosed they are much better at protecting the material from contamination or conveying a material that can easily become airborne. Therefore, in some environments the pneumatic conveyance system is the only real choice for moving material from location A to location B. However, pneumatic conveyance systems typically have higher energy consumption costs then mechanical conveyance systems due to the way in which they operate.

In the typical pneumatic conveyance system the user is either using pressurized air to push a material through the system or a large vacuum to suck the material through the system. The airflow within the pneumatic conveyance system may move at a rate as fast as 40-45 miles per hour depending on the material moved and do so 24 hours a day. In either configuration there may exist airflow that is not used to move material (waste airflow). In some cases, this waste airflow is vented to the outside air. Alternatively, the waste airflow may be dispersed inside the facility (possibly after further filtration).

With the ever increasing cost of power to industrial users (e.g., cost of electricity per Kilowatt hour, coal cost per ton, natural gas cost per thousand cubic feet) it is essential that those in industry maximize the efficiency of the machines and devices that they utilize in their operations. The increased cost of power will increase the cost of using pneumatic conveyance systems. What is needed is a way to reduce the cost of operating pneumatic conveyance systems and/or a means to recover residual energy from the waste airflow.

SUMMARY

An economical way to produce electrical energy without adversely impacting the environment, without utilizing fossil fuels, and without the need to construct large structures such as wind turbines, dams or water retention lakes, and the like is disclosed. The disclosure is for a pneumatic conveyance system having airflow electrical power generation incorporated therein to utilize waste airflow, which otherwise is unused and is normally discarded, to generate power. The supply of waste airflow is readily available in already existing pneumatic conveyance systems, or new systems to be built, in commercial and industrial facilities in most industrialized cities and countries around the world.

Conventionally, waste airflow is the result of a pneumatic conveyance system where a material, whether product or by-product, is transported from one location to another via conveyance ducts. After the material has been removed form the conveying airflow, the waste airflow may be released to atmosphere or returned to an interior space via air distribution plenums and/or ducting. These ducts and plenums may convey the waste airflow at rates of up to 40-45 miles per hour for up to 24 hours a day. The waste airflow may include small solid materials or particulate, in many installations. However, it may be acceptable to release the waste airflow to the atmosphere (and possibly interior space) or these materials or particulate may be captured upstream by additional filtration (dust collection systems) prior to distribution. The waste airflow may be of the consistency or quality that is close to that of clean air prior to and/or after upstream filtration.

It is contemplated here to provide an aerodynamically designed air turbine that may be arranged in various configurations inside the ducting and/or plenum. Utilizing the turbine within the plenum and/or ducting provides a more focused/controlled airflow then would be available if the turbines were located external to the waste airflow being disbursed (e.g., turbines on the roof of a building in close proximity to where the waste airflow is externally distributed, turbines within a facility in close proximity to where the waste airflow is internally distributed). The waste airflow passing across the turbine surfaces causes the turbine to rotate. The rotational force of an air turbine drive shaft will be in communication with and provide the force needed to drive a conventional electrical power generator. The number of generators and turbines that are driven by the waste airflow can vary depending upon the conveyance system. After the waste airflow passes the turbines, it may then continue through the ducting or plenums towards its final destination. That destination may be additional air cleaning or filtration equipment, a material vacuum, indoor air distribution ducting, and/or the outside atmosphere.

The amount of electricity generated by the power generating system may provide sufficient electrical power to augment or supplement a conventional pneumatic conveyance system. The electrical power generated may be connected to a grid via the local power utility provider and sold back to the utility provider to offset or reduce the cost of electrical power required to operate the pneumatic conveyance system or it may be used to power other electricity consuming systems.

As contrasted with conventional wind turbine electrical power generating facilities, the present power generating system does not need to rely upon the presence of naturally generated air currents to rotate the turbine. Nor does this power generating system adversely impact the operation of the conventional conveyance system with which it is associated.

An object of this disclosure is to provide a means to conserve the electrical cost of a pneumatic conveyance system through generating electrical power from waste airflow that would otherwise be discarded. Another objective is to provide the user of a pneumatic conveyance system with a relatively inexpensive means for generating electrical energy without adversely impacting the environment or the local ecology, and doing so without utilizing fossil fuels such as coal or oil.

The power generating system may be used during times of the day where heavy loads of electricity are required. The peak times for heavy electrical loads may closely parallel the times of peak waste airflow in industrial or commercial applications. The use of the waste airflow as an energy source for the power generating system simply utilizes some portion of the waste airflow without substantially affecting the conveying airflow. Conventional dampers and diverter valves may be included in the power generating system to quickly turn on or off the power generating system, or portions thereof, on short notice, without disrupting the functioning of the pneumatic conveyance system. The power generating system adds relatively little in the way of structure to an existing pneumatic conveyance system making the power generating system relatively easy to acquire and operate.

BRIEF DESCRIPTION OF THE DRAWINGS

The features and advantages of the various embodiments will become apparent from the following detailed description in which.

DETAILED DESCRIPTION

Figure 1:
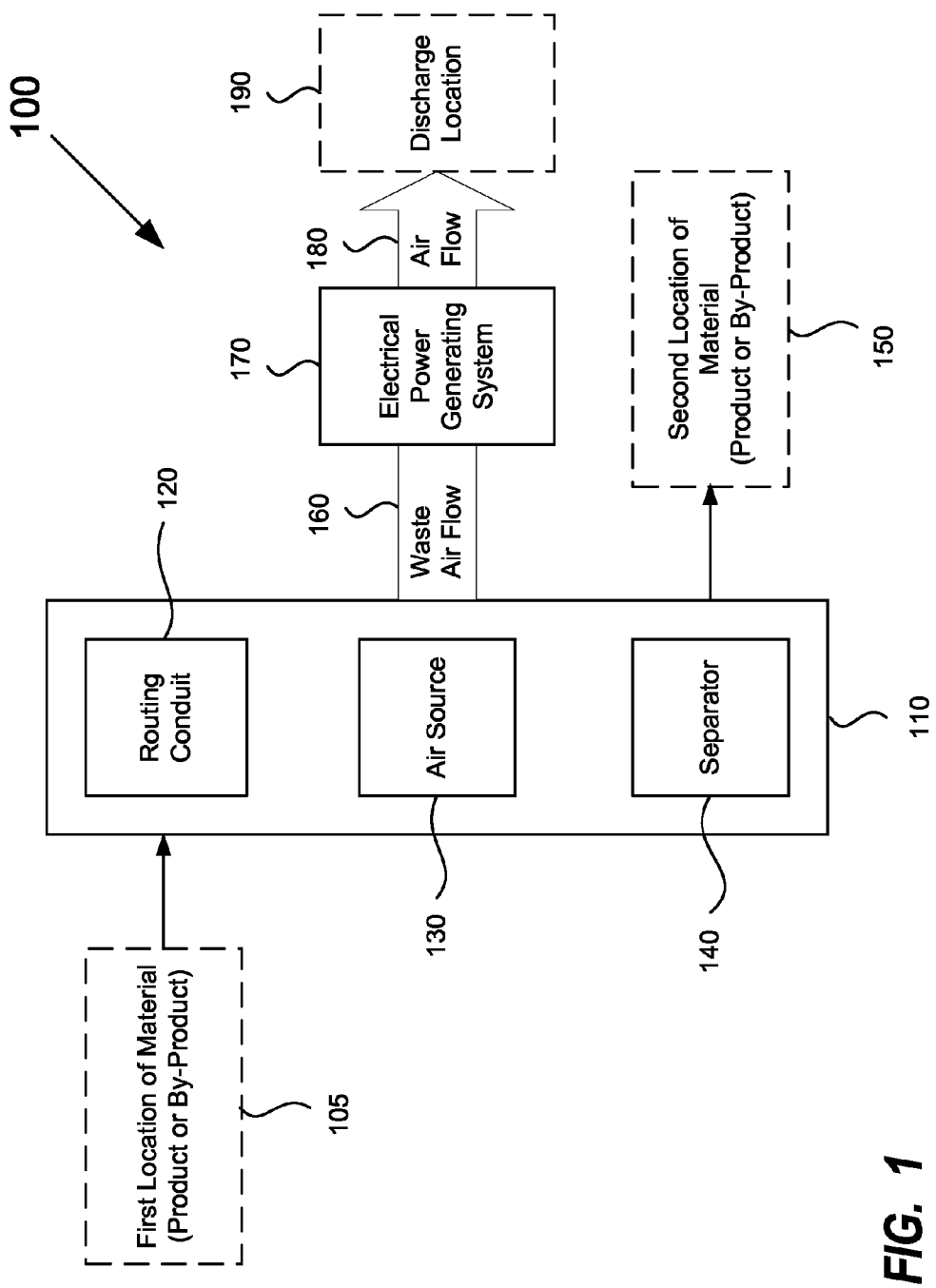
FIG. 1 illustrates a block diagram of an example pneumatic conveyance power generating system, according to one embodiment.

FIG. 1 illustrates a block diagram of an example pneumatic conveyance system including waste airflow electrical power generation (pneumatic conveyance power generating system) 100. The system 100 may include a pneumatic conveyance system 110 to move material from a first location 105 to a second location 150. The pneumatic conveyance system 110 may include routing conduit 120 (e.g., ducts, tubs, channels) to provide a pathway through which the material is moved from the first location 105 to the second location 150, an airflow source 130 to provide an airflow to facilitate the transportation of the material through the routing conduit 120, and a separator 140 to filter the material from the airflow. Waste airflow 160 (e.g., the airflow exiting the separator 140) may be a byproduct of pneumatic conveyance system 110. The waste airflow 160 that typically may be discharged from the pneumatic conveyance system 110 via a plenum (conduit utilized to discharge or distribute) may be provided to an electrical power generating system 170 that may utilize the waste airflow 160 to generate power.

The power generating system 170 may be located within the plenum used to discharge the waste airflow 160. Any waste airflow 180 not consumed by the power generating system 170 (non-consumed waste airflow 180) may be discharged from the system 100 via the plenum. The non-consumed waste airflow 180 may be discharged at a discharge location 190 to, for example, the atmosphere (e.g., external to a facility) or may return the airflow to the facility.

The material that is pneumatically conveyed may be any product (e.g., raw material, any intermittent portion of a product, final product) or any by-product (e.g., dust, scrap material, waste, fumes) produced as part of any processing step performed on the product that needs to be moved from one location to another for any reason (e.g., next step in processing, from processing to transport, from processing to storage, from storage to processing, from storage to transport). The material pneumatically conveyed may be a solid, liquid, vapor, powder, or any combination thereof. By way of example, the conveyance system 110 may be utilized to move grain from a silo to a freight train for transport, cups from location where they exit a production line to location where they are packaged, and scrap paper from point on a product line where paper is cut to location where scrap paper is collected.

The routing conduit 120 may be any size and/or shape necessary to move the material. The size/shape may be selected based on, for example, the material to be moved, the distance the material is to be moved, physical limitations of the facility where conveying is done, and the amount and/or pressure of the airflow. For example, for products, the routing conduit 120 may be slightly bigger than the product to ensure the product fits therethrough while limiting the shifting of the product or the impacting of the product with the conduit during transport. For by-product, the routing conduit 120 may be large enough to contain a certain volume of by-product. Standard ducts and/or tubes may be utilized to provide the routing conduit 120 or special ducts and/or tubes may be designed based on, for example, the material to be conveyed and the distance it is to be conveyed, physical/environment parameters of the material or the facility, and type of airflow source. The routing conduit 120 may be, for example, metal or plastic and may or may not be insulated.

The airflow source 130 may create pressurized airflow that pushes the material through the routing conduit 120 (for ease of discussion when the airflow source 130 is operated in this fashion it will be referred to as a fan) or may create pressurized airflow that pulls material through the routing conduit 120 (for ease of discussion when the airflow source 130 is operated in this fashion it will be referred to as a vacuum). The airflow source 130 may be any device that causes air to flow at a rate capable of moving the material. For example, the airflow source 130 may include blades configured together and connected to a shaft that is turned by a motor to create the airflow (collectively referred to as a fan or a vacuum depending on the direction turned and respective airflow produced).

The size, number and pitch of the blades as well as the speed that the motor turns the blades may control the pressure and speed of the airflow created thereby. By way of another example, the airflow source 130 may be the release of a gas or a chemical reaction that causes the airflow.

The airflow created by the airflow source 130 is not limited to atmospheric air (e.g., 79% nitrogen-21% oxygen) but rather can be the flow of any gaseous combination that could be utilized to move material (for ease of discussion airflow will be used herein to describe any gaseous displacement that may facilitate the transportation of a material from one location to another). For example, the use of oxygen to move metal objects may lead to rusting and accordingly a different gas may be utilized to move the metal in order to preserve the metal.

A single airflow source 130 or multiple airflow sources 130 may be utilized to transport the material. The number, size and type of airflow sources 130 depends, for example, on the material to be conveyed and the distance and speed it is to be conveyed, the type and size of the routing conduit 120, and physical, environmental and cost parameters/limitations.

The separator 140 may be any type of device or devices that separate the material from the airflow. For example, the separator 140 may be a cyclone where the airflow is slowed down so that the material falls to the bottom and the airflows out the top. The separator 140 may be a filter that the airflow is passed through that blocks the material but allows the airflow to pass therethrough. The separator 140 may be a combination of various different devices where each device separates part of the material from the airflow (e.g., bigger contents first followed by smaller contents).

The waste airflow 160 may be air that is not being utilized to its full capability. The waste airflow 160 may be airflow that is free of particles that would interfere with the airflow being utilized to create electricity (e.g., turn blades of a turbine). For example, the waste airflow 160 may be air that exits the separator 140 and is no longer needed to transport the material. The waste airflow 160 may be airflow that can be distributed to the distribution location 190 or may be airflow that requires further filtration prior to being distributed. The waste airflow 160 may be pressurized air or a vacuum flow.

The power generating system 170 may be located within the routing conduit 120 to receive the waste airflow 160. The power generating system 170 may utilize the airflow to generate electricity. The power generating system 170 may include, for example, a turbine (e.g., a plurality of blades configured together and connected to a shaft) that rotates based on the airflow, a generator (e.g., a magnetic shaft within windings, shaft with windings within magnet) that generates electricity based on rotation of turbine, and a coupling to transfer the rotation of the turbine (e.g., shaft) to the generator (e.g., magnetic shaft). The power generating system 170 may include a plurality of turbines and corresponding couplings and generators and the turbines and corresponding couplings and generators may be associated with, and possibly included within, the same routing conduit 120 or different routing conduits 120.

The power generating system 170 may also include power lines to distribute the power generated thereby to other parts of the system 100 including the pneumatic conveyance system 110 or to other powered items in the facility. It is possible that the power generating system 170 may also include a control system to convert the power generated thereby to a form that can be utilized by a power grid and may provide this power to the power grid via power transmission lines connecting the power grid to the facility.

Figure 2:
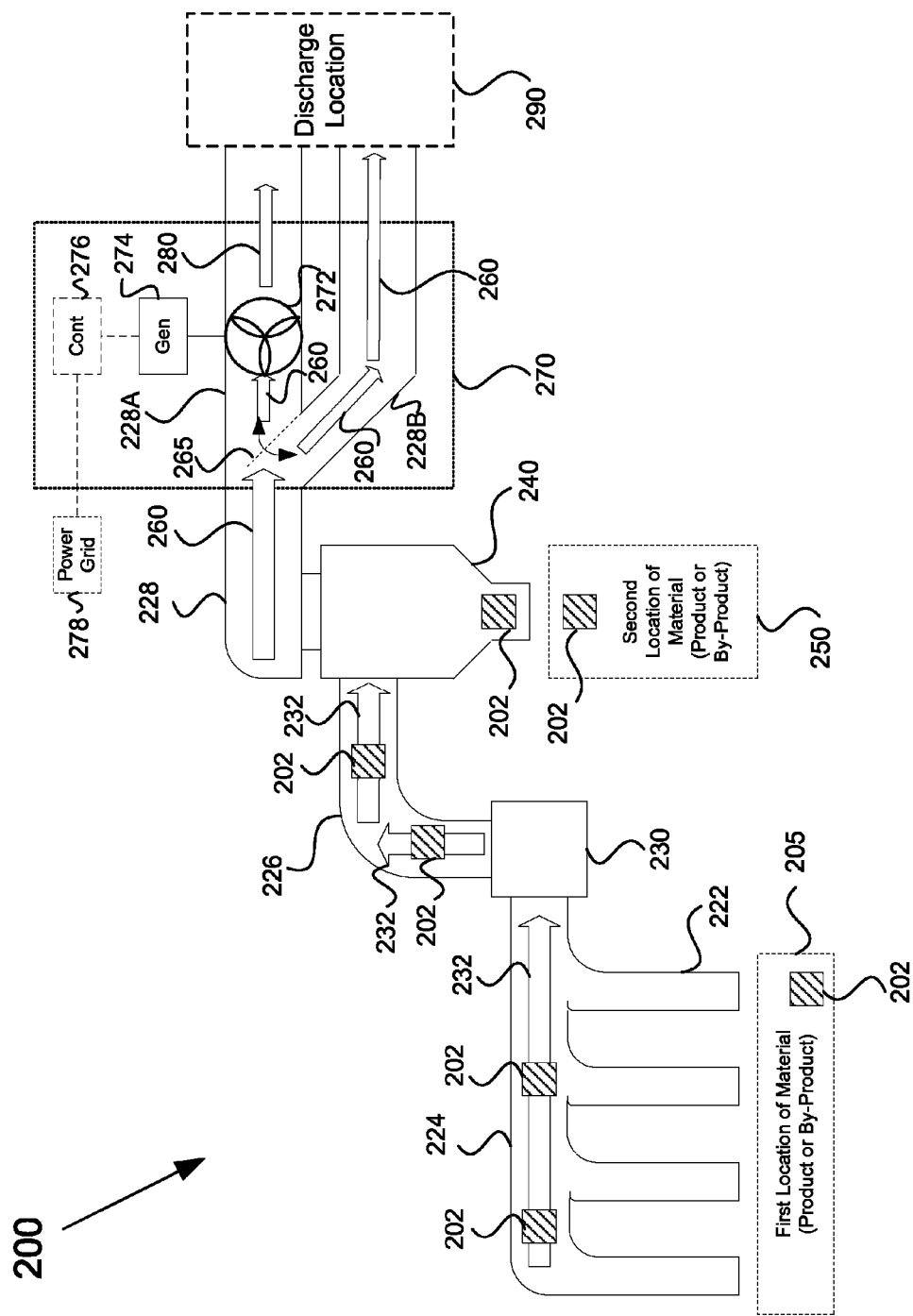
FIG. 2 illustrates a schematic diagram of an example fan operated pneumatic conveyance power generating system, according to one embodiment.

FIG. 2 illustrates a schematic diagram of an example fan operated pneumatic conveyance system having waste airflow electrical power generation (fan operated pneumatic conveyance power generating system) 200. The system 200 may convey a material 202 from a first (e.g., starting) location 205 to a second (e.g., ending) location 250. The system 200 may include material routing conduit 222, 224, 226, an airflow source (e.g., one or more fans) 230, a material separator 240, and exhaust routing conduit 228. The material routing conduit 222 (branch ducts) may be used to gather the material (product, by-product) 202 from the starting location 205 (e.g., various points on an assembly line, various storage locations). For ease of illustration the material 202 is simply illustrated as boxes.

The branch ducts 222 may be feed into the material routing conduit 224 (main duct) that is used to collect and transport the material 202 from each of the branch ducts 222. The main duct 224 may be feed into the material routing conduit 226 (transport duct) that is used to transport the material 202 to the material separator 240. The one or more fans 230 may, when activated, create a conveying airflow 232 such that the material 202 may be drawn from the starting location 205 and transported to the material separator 240 within the conveying airflow 232 via the material routing conduit 222, 224, 226. The fans 230 may be located so as to be in communication with both the main duct 224 and the transport duct 226. The fan 230 may provide an airflow (blow air) into the transport duct 226 that in turn creates a vacuum in the ducts 222, 224.

The material routing conduit 222, 224, 226 is not limited to the configuration as illustrated. Rather, the configuration (e.g., number, type, size, orientation) of the material routing conduit 222, 224, 226 may be selected based on, for example, the material 202 to be moved and the distance that the material 202 is to be moved. The location of the fans 230 is not limited to that illustrated and in fact the fans 230 may be located at multiple locations. The location of the fans 230 may be selected based on, for example, the material 202 to be moved, the configuration of the system 200 including the configuration of the material routing conduit 222, 224, 226, and the distance that the material 202 is to be moved.

The material 202 transported within the conveying airflow 232 may be provided to the material separator 240 to separate the conveying airflow 232 and the material 202. The material separator 240 may be a cyclone (as illustrated) where the conveying airflow 232 carrying the material enters an upper portion. As the conveying airflow 232 swirls around the cyclone 240, the speed of the airflow is reduced and as the speed is reduced the material 202 falls to the bottom of the cyclone 240 where it can be removed and provided to the second location 250. The slowed airflow may exit the top of cyclone 240. If the airflow that exits the cyclone 240 is sufficiently devoid of big particles that could interfere with turning a turbine, this exhaust flow may be waste airflow 260 (as illustrated). If the exhaust of the cyclone 240 still contains particles, separate from the material separated by the cyclone 240, that may interfere with the turning of a turbine the exhaust may need to be processed through additional devices, such as filters (not illustrated), before being considered waste airflow 260.

While the material separator 240 is illustrated as a cyclone it is not limited thereto. Rather the material separator 240 may be any device utilized to separate the material from the airflow including filters. The separator 240 may be a combination of devices (possibly different devices). If separator 240 includes a combination of devices and the exhaust air from any of the intermediate devices (prior to final exhaust of the separator 240, prior to discharge 290) is sufficiently devoid of big particles that could interfere with turning a turbine this exhaust flow may be waste airflow 260 even though it is still within the separator 240.

The waste airflow 260 from the separator 240 (top of cyclone) may be routed to a discharge location (e.g., back to facility, externally) 290 via the exhaust routing conduit 228 (exhaust plenum). Prior to being discharged the waste airflow 260 may be provided to a power generating system 270 that is contained within the exhaust plenum 228. The power generating system 270 may include one or more turbines 272 connected to an associated one or more generators 274 via associated couplings (not illustrated). The waste airflow 260 may cause the turbines 272 to turn and the couplings may transfer the rotation to the generators 274 that may generate electricity therefrom. Any waste airflow 260 not consumed by the power generating system 270 (non-consumed waste airflow 280) may be discharged from the discharge location 290.

The power generating system 270 (generators 274) may be connected to the system 200 via power lines (not illustrated) so that the power generated thereby may be utilized to provide at least a portion of the power required to operate the system 200. According to one embodiment, the power generating system 270 may include a power distribution controller 276 to condition the power for transfer to a power grid 278. The power grid 278 may be internal to the facility, external to the facility or a combination thereof. The grid 278 may permit the power to be used internally and/or to sell the power to, for example, a utility company, utility co-op, or other business.

The configuration of the turbines 272 is not limited to that illustrated (vertical, shaft perpendicular to flow). Rather, the turbines 272 may configured in any number of ways (e.g., horizontal, shaft parallel to the flow) and if multiple turbines 272 are included within a plenum 228 the turbines 272 may be aligned the same or differently.

The exhaust plenum 228 may branch into a plurality of branch plenums 228A, 228B. The power generating system 270 (turbines 272) may be included in at least a first portion of the branch plenums 228A (power generating branch plenums). The waste airflow 260 may be diverted from the power generating system 270 in a second portion of the branch plenums 228B (diverter branch plenums), for example, when the power generating system 270 is non-operational. Dampers and/or diverters 265 may be used to control what branch plenums 228A, 228B the waste airflow 260 is transmitted to and/or to control how much waste airflow 260 is transmitted therethrough.

For example, when the power generating system 270 is operational the diverters 265 may route the waste airflow 260 to the power generating branch plenum 228A. When the power generating system 270 is non-operational, for example, when it is being serviced or the operation of the system 200 is such that the waste airflow is minimal and would not generate much power, the diverters 265 may route the waste airflow 260 to the diverter branch plenum 228B (no power generating system 270).

The dampers and/or diverters 265 may be manually operated or may be operated by a control unit (not illustrated). The control unit may be integrated into a control unit that operates the pneumatic conveyance system or may be separate therefrom. The control unit may automatically configure the dampers and/or diverters 265 based on operation of the system and/or may configure the dampers and/or diverters 265 based on commands from an operator. The dampers and/or diverters 265 may be positioned using any means known (e.g., hydraulics, hinges, gears) to control the location and configuration within the exhaust plenum 228.

It should be noted that the number of branch plenums 228A, 228B is not limited to two as illustrated with one power generating branch plenum 228A and one diverter branch plenum 228B. Rather, any number of plenums could be used with any number having turbines 272 contained therein and any number simply routing the waste airflow 260 therethrough. The number and size of the plenums may be based on a number of factors, including, but not limited to, flow (speed, pressure) of the waste airflow, amount of power to be generated, room available for the plenums, and current configuration of the plenums. The diverters 265 may be located within individual plenums or may be associated with groups of plenums and be used to open, close or restrict the plenums or group of plenums.

It should be noted that if the waste airflow 260 exiting the material separator 240 is not sufficiently filtered to be disbursed to the discharge location 290 (e.g., still includes particles) it may need to pass through additional filters (not illustrated). The power generating system 270 (turbines 272) may be located in the exhaust routing conduit 228 (exhaust duct) between the material separator 240 and the filters, in the exhaust routing conduit 228 (exhaust duct) between sets of filters if multiple filters are used, and/or in the exhaust routing conduit 228 (exhaust plenum) between the filter and the discharge location 290.

It should also be noted that if the material 202 being transported from the first location 205 to the second location 250 is such that it would not interfere with turning turbines (e.g., gas, fumes) then the power generating system 270 (turbines 272) may be located in the material routing conduits 222, 224 and/or 226.

According to one embodiment, the power generating system 270 (turbines 272) may be located external to the discharge location 290 in alignment with the discharge of the waste airflow 260 (external power generating system 270) in addition to, or in place of, the power generating system 270 (turbines 272) utilized within the system 200 (e.g., in routing conduits 222, 224, 226 and/or 228). However, an external power generating system 270 may not be as efficient as an internal power generating system 270 since the airflow external to the system 200 is not controlled by the routing conduit and may quickly disperse.

Figure 3:
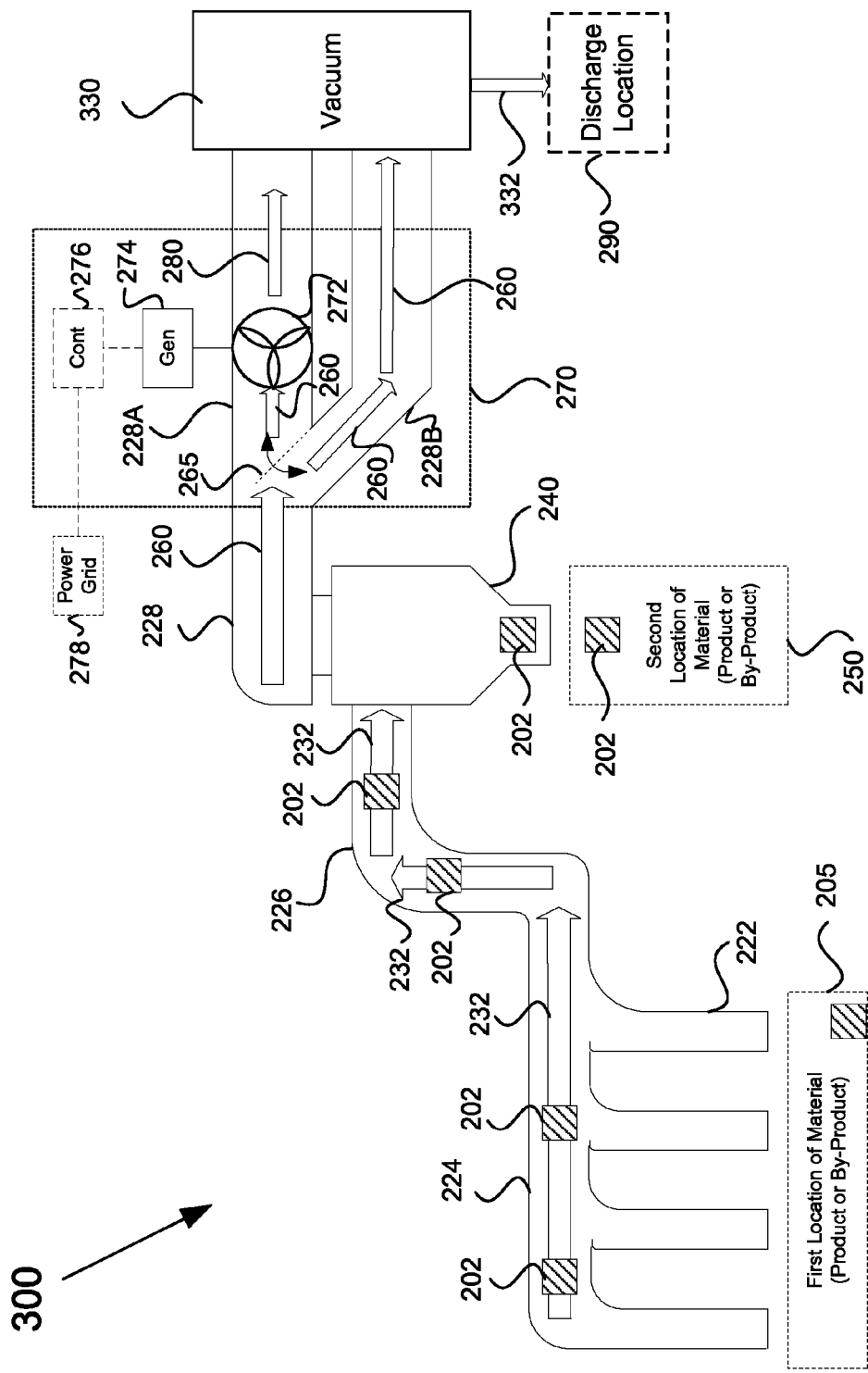
FIG. 3 illustrates a schematic diagram of an example vacuum operated pneumatic conveyance power generating system, according to one embodiment.

FIG. 3 illustrates a schematic diagram of an example vacuum operated pneumatic conveyance system having waste airflow electrical power generation (vacuum operated pneumatic conveyance power generating system) 300. The vacuum operated pneumatic conveyance power generating system 300 is similar to the system 200 of FIG. 2. However, rather than utilize fans 230 the system may utilize one or more vacuums 330. The vacuums 330, when activated, may create a conveying airflow 232 such that the material 202 may be drawn from the starting location 205 and transported to the material separator 240 within the conveying airflow 232 via the material routing conduit 222, 224, 226. The vacuums 330, as illustrated, may be located after the material separator 240. The location of the vacuums 330 is not limited to that illustrated and in fact the vacuums 330 may be located at multiple locations. The location of the vacuums 330 may be selected based on, for example, the material 202 to be moved, the configuration of the system 200 including the configuration of the material routing conduit 222, 224, 226, and the distance that the material 202 is to be moved.

The exhaust routing conduit 228 (exhaust duct) may provide the airflow between the separator 240 (top of cyclone) and the vacuum 330 and the airflow may be considered waste airflow 260. The power generating system 270 may be contained within the exhaust duct 228. Any vacuum exhaust 332 may be exhausted from the system 300 at the discharge location 290 (external, back to facility).

If the waste airflow 260 exiting the material separator 240 is not sufficiently filtered to be disbursed to the distribution point 290 that it may need to pass through additional filters (not illustrated). The power generating system 270 may be located in the routing conduit 228 between the material separator 240 and the filters, in the routing conduit 228 between sets of filters if multiple filters are used, and/or in the routing conduit 228 between the filter and the vacuum 330.

It should be noted while FIG. 2 illustrated a fan operated pneumatic conveyance power generating system 200 and FIG. 3 illustrated a vacuum operated pneumatic conveyance power generating system 300, pneumatic conveyance power generating systems are not limited to one or the other. Rather, a power generating system could be implemented in a pneumatic conveyance system utilizing both fans and vacuums.

Figure 4:
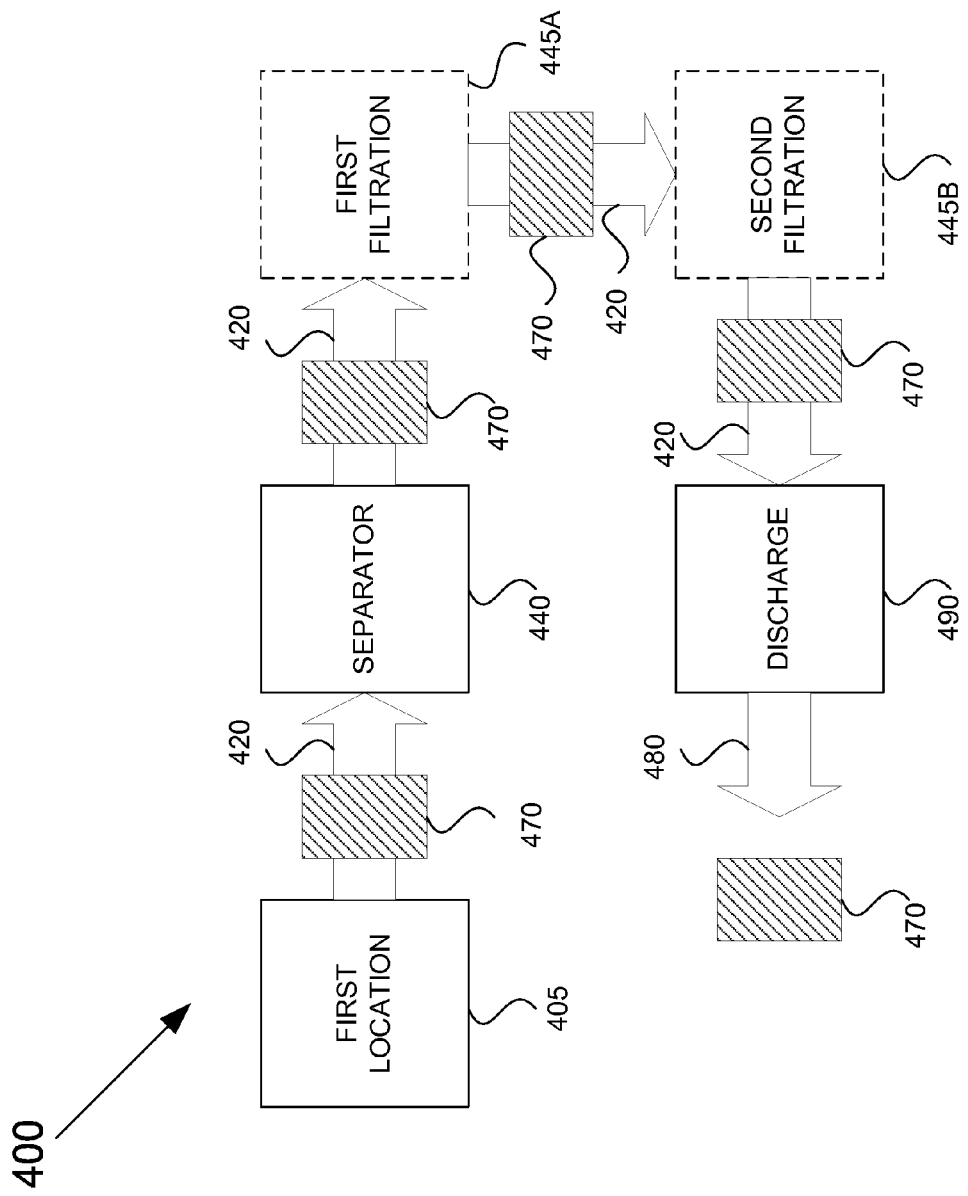
FIG. 4 illustrates a block diagram of an example pneumatic conveyance power generating system showing potential locations of a power generating system, according to one embodiment.

FIG. 4 illustrates a block diagram of an example pneumatic conveyance power generating system 400 showing potential locations of a power generating system. The system 400 utilizes conduit 420 to route material (product, by-product) from a first location 405 to a separator 440 by utilizing airflow. The conduit 420 is then utilized to route the airflow from the separator 440 to a discharge location 490 (external, facility) where remaining airflow 480 is discharged. The conduit 420 may route the airflow through one or more filters 445A, 445B prior to routing to the discharge location 490. A power generating system (turbines) 470 may be located with the conduit 420 at any point where the airflow traveling therethrough is substantially free of material or particles that would interfere with the operation of the turbine. For example, if the material being traversed from the first location 405 to the separator 440 is a vapor or minute particles a turbine may be located therewithin. A power generating system (turbines) 470 may be located external to the system 400 to utilize the remaining airflow 480 discharged therefrom.

Figure 5A:
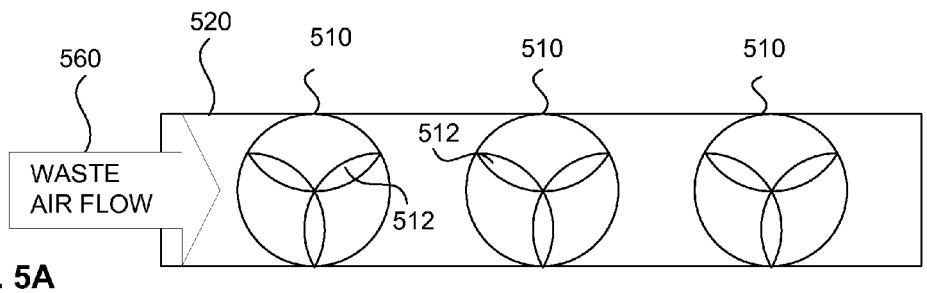
FIGS. 5A-D illustrate example configurations of turbines within routing conduit having waste airflow traveling therethrough, according to one embodiment.
Figure 5B:
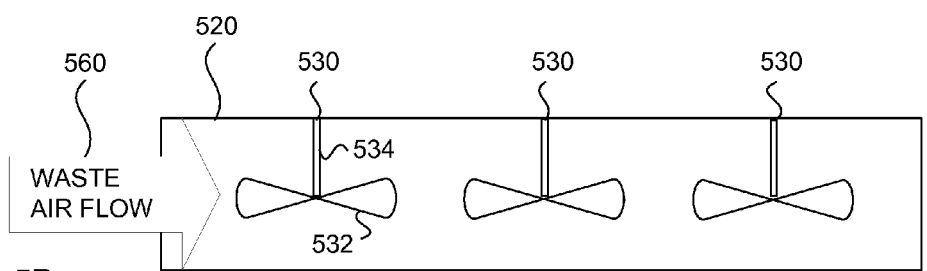
Figure 5C:
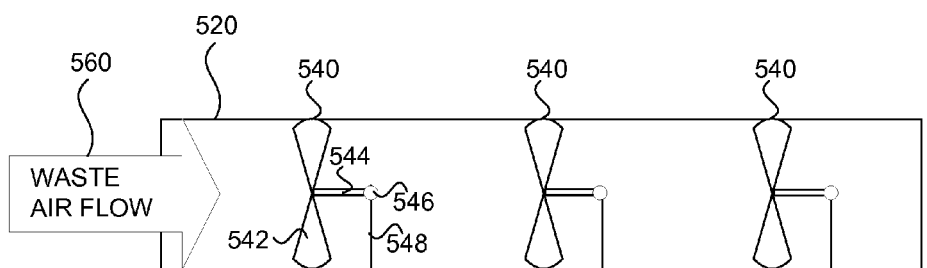

FIGS. 5A-D illustrate cross-sectional views of routing conduit 520 with example configurations of turbines therewithin. The configurations illustrated are in no means exhaustive and simply serve to demonstrate some possible orientations that may be used. FIG. 5A illustrates a plurality of turbines 510 oriented vertically. The turbines 510 may include a plurality of blades 512 connected to a shaft (not visible as illustrated as it is extending into or out of the page). FIG. 5B illustrates a plurality of turbines 530 oriented horizontally. The turbines 530 may include a plurality of blades 532 connected to a shaft 534. FIG. 5C illustrates a plurality of turbines 540 oriented vertically. The turbines 540 may include a plurality of blades 542 connected to a shaft 544. The turbine shaft 544 may be connected to a coupler 546 that may transfer the rotation to a generator shaft 548.

Figure 5D:
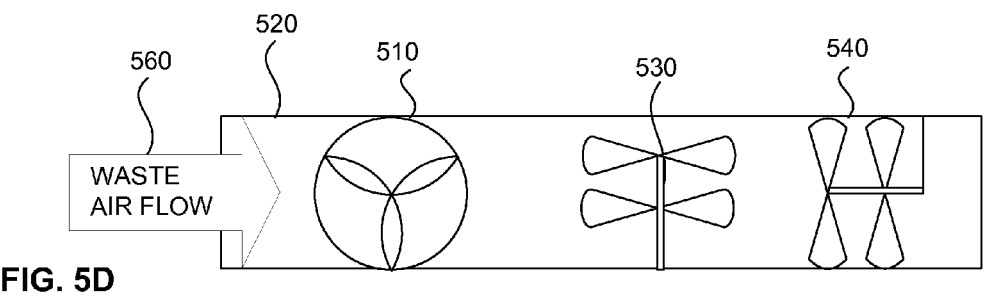

FIG. 5D illustrates a plurality of different turbines 510, 530, 540 contained within the routing conduit 520. The turbines may include multiple sets of blades connected to the same shaft. The turbines 510, 530, 540 of FIGS. 5A-5D are rotated as waste airflow 560 travels thereby (the direction of rotation may be controlled by the pitch of the blades 512, 532, 542).

Figure 6A:
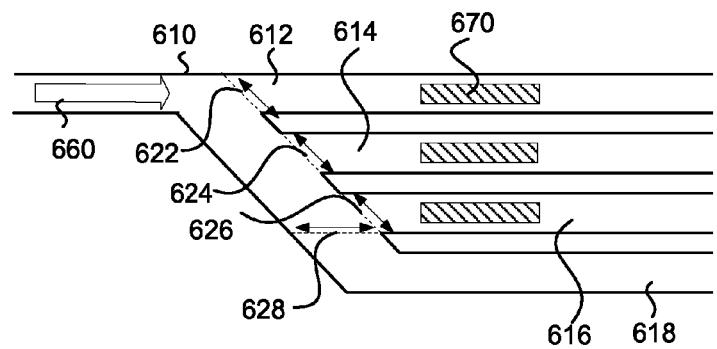
FIGS. 6A-C illustrate example configurations of routing conduit branching to handle power generating paths and diverted paths, according to one embodiment.
Figure 6B:
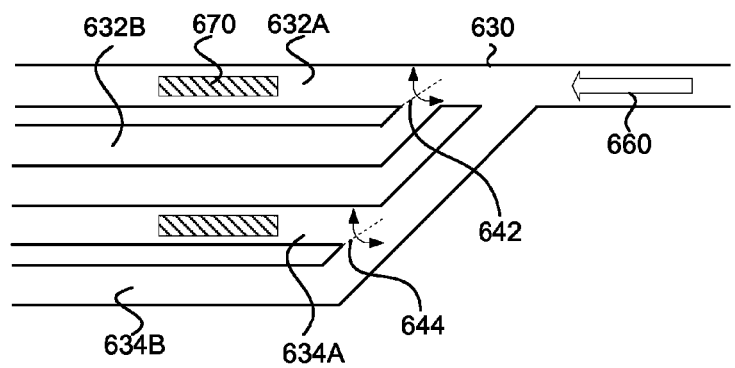
Figure 6C:
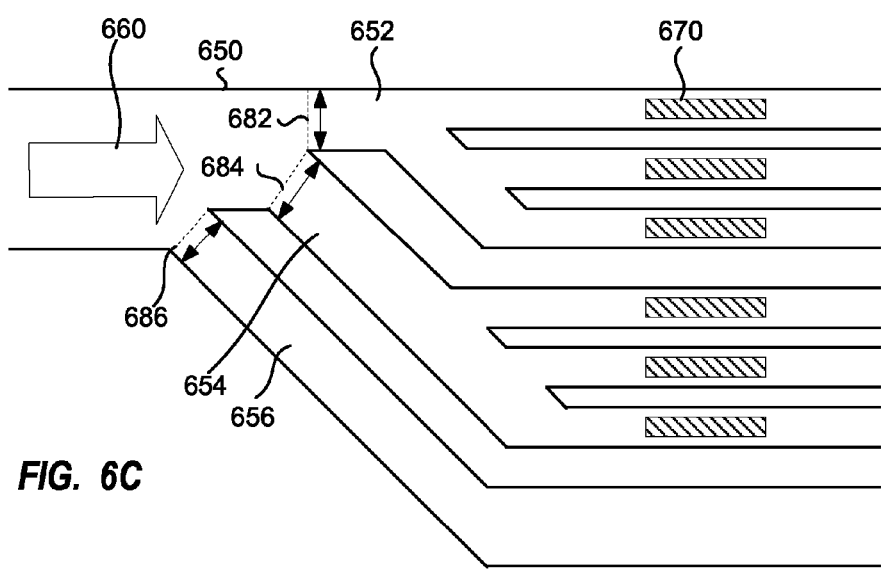

FIGS. 6A-C illustrate example configurations of routing conduit branching to handle power generating paths and diverted paths. The configurations illustrated are in no means exhaustive and simply serve to demonstrate some possible orientations that may be used. FIG. 6A illustrates routing conduit 610 splitting into braches 612, 614, 616, 618 with each branch having a damper and/or diverter 622, 624, 626, 628 controlling whether, and/or how much of, the waste airflow 660 passes therethrough. As illustrated branches 612, 614, 616 contain power-generating systems 670 (illustrated as a box for simplicity) and branch 618 is a diverting path for any combination of the power generating branches 612, 614, 616.

FIG. 6B illustrates routing conduit 630 splitting into braches 632, 634 where each branch 632, 634 includes a power generating path 632A, 634A (including power generating systems 670) and a diverter path 632B, 324B. Each branch may include a damper and/or diverter 642, 644 controlling whether, and/or how much of, the waste airflow 660 passes therethrough.

FIG. 6C illustrates routing conduit 650 splitting into braches 652, 654, 656 and each branch including a damper and/or diverter 682, 684, 686 controlling whether, and/or how much of, the waste airflow 660 passes therethrough. The branches 652, 654 may be further divided into sub-branches where the diverters 682, 684 control all of the respective sub-branches. As illustrated, each of the sub-branches includes a power generating system and the branch 656 is the diverting path.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. In a pneumatic conveyance system to convey material, the system having
    material routing conduit to provide a pathway through which a material is moved from a first location to a second location;
    an electro-mechanical airflow source configured and operable to provide an airflow for the transportation of the material through the material routing conduit;
    a separator to filter the material from the airflow at the second location; and
    exhaust routing conduit to provide a pathway through which the excess airflow from the separator is provided to a discharge location, a method of generating power from excess airflow comprising
    providing one or more turbines located within the exhaust routing conduit to be rotated by the excess airflow; and
    providing one or more generators associated with and in communication with the one or more turbines to generate electricity based on rotation of the associated turbines.

2. The method of claim 1, wherein the electro-mechanical airflow source includes one or more fans.

3. The method of claim 1, wherein the electro-mechanical airflow source includes one or more vacuums.

4. The method of claim 1, wherein the separator includes one or more cyclones.

5. The method of claim 1, wherein the separator includes one or more filters.

6. The method of claim 1, further comprising one or more filters within the exhaust routing conduit to remove particles from the excess airflow.

7. The method of claim 1, further comprising providing a plurality of branches and diverters within the exhaust routing conduit to control which branches the excess airflow is routed, wherein the one or more turbines are located in a subset of the branches.

8. The method of claim 1, further comprising providing a power distribution controller to condition the electricity generated by the one or more generators for transfer to a power grid.

9. The method of claim 1, further comprising
providing one or more additional turbines located within the material routing conduit to be rotated by the airflow; and
providing one or more generators associated with the one or more additional turbines to generate electricity based on rotation of the associated turbines.

10. The method of claim 1, further comprising
providing one or more additional turbines located external to the discharge location to be rotated by the excess airflow discharged; and
providing one or more generators associated with the one or more additional turbines to generate electricity based on rotation of the associated turbines.

11. The method of claim 1, wherein
the electro-mechanical airflow source includes one or more fans in communication with the material routing conduit;
the exhaust routing conduit includes a plurality of branches; and
the method further includes providing one or more diverters within the exhaust routing conduit to control routing of the excess airflow through the branches, wherein the one or more turbines are located within a first subset of the branches of the exhaust routing conduit and the diverters may divert the excess airflow away from the turbines to a second subset of branches.

* * * * *